June 21, 1966  L. I. MAISSEL  3,257,592
MULTIPLE LAYER ANODIZED FILM CAPACITOR AND METHOD
OF MAKING SAME
Filed June 30, 1964
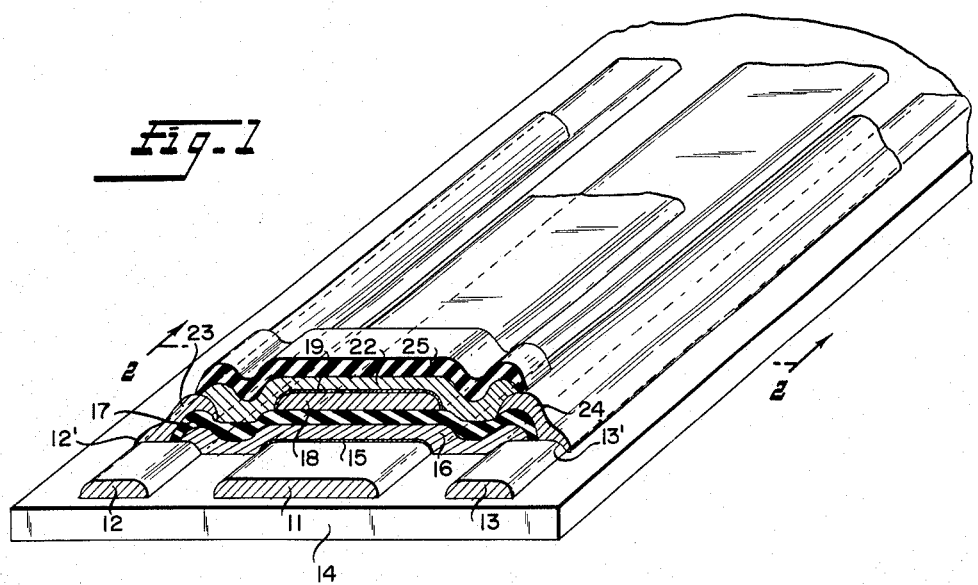
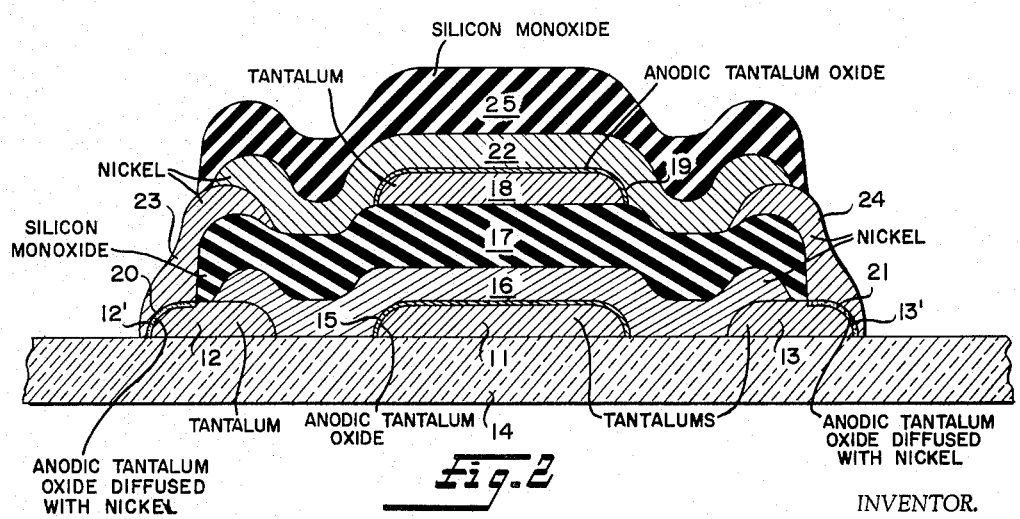
INVENTOR.
LEON I. MAISSEL
ATTORNEYS

United States Patent Office 3,257,592
Patented June 21, 1966

3,257,592
MULTIPLE LAYER ANODIZED FILM CAPACITOR AND METHOD OF MAKING SAME
Leon I. Maissel, Poughkeepsie, N.Y., assignor to International Business Machines Corporation, New York, N.Y., a corporation of New York
Filed June 30, 1964, Ser. No. 379,141
7 Claims. (Cl. 317—258)

The present invention relates to electrical capacitors, and more particularly it relates to multilayer thin film capacitors constructed principally by cathodic sputtering.

Generally speaking, a capacitor in essence consists of two conductive plates or sheets separated by a dielectric material. But for the purpose of securing an increased capacitance, many capacitors; especially the ones used for low voltage operation, are made by arranging alternately a plurality of conductive and dielectric sheets, layers or laminas.

Since the capacitance of a capacitor decreases with the thickness of the dielectric layer sandwiched in between the conductive plates, for higher values of capacitance usually it is desirable to use dielectric films which are as thin as practicable. Moreover, the present day accent on miniaturized components and technology requires the same characteristic for conductive sheets. Thus a large number of modern multilayer miniaturized capacitors consist of a plurality of extremely thin films of suitable conductive metals separated by thin anodically grown oxide insulating layers. Briefly, the multilayer thin film capacitor of this type using anodic oxide films as dielectric separators typically is constructed by the following process:

A conductive film of a suitable valve metal is sputtered on a suitable substrate, for instance, glass. This film acts as the base electrode. It is then anodized to grow a thin insulating oxide coating, or layer, on its surface. A second conductive film of another suitable metal is selectively vapor deposited on the oxide coated metal film and the substrate in such a way that a small end portion of the anodically coated valve metal film remains exposed. This exposed portion is used to contact the first valve metal film to the subsequently sputtered similarly conductive valve metal films that form part of the base, or first electrode; the second conductive film forming the counter-electrode. An insulating coating substantially thicker than the first anodic layer is next vapor deposited on selected portions of the second conductive film in such a manner that parts of the second conductive film extending over from the oxide coated film to the substrate remain uncovered by the dielectric coating. Since valve metals, in general, have a tendency to short through the oxide insulators, this thick layer of a dielectric material, such as silicon monoxide, only serves to insulate the first valve metal film and its counter-electrode from subsequently formed similar units.

A second valve metal film is next sputtered on desired portions of the thick dielectric layer such that an end portion of this film extends over the dielectric coating and contacts the exposed portion of the first valve metal film. However a great difficulty arises when this unit consisting of a plurality of conductive films and dielectric separators is subjected to a second anodizing operation to grow an insulating oxide layer on the second valve metal film. The full voltage that is applied to form the oxide on the second valve metal film also appears across the previously formed anodic layer on the first valve metal film underlying the exposed portion of the second conductive film which acts as the counter-electrode. Since this oxide coating is rarely capable of withstanding the full original anodization voltage, the anodic layer breaks down, causing short-circuiting between the first or the base electrode and the counter-electrode. Of course, many solutions, such as the use of resists and maskants on the exposed portions of the counter-electrode film overlying the anodic oxide layer, have been proposed to circumvent this problem. However, the practical application of these proposed solutions are rather tedious and wasteful. Besides, many of these proposed solutions unnecessarily add a multiplicity of steps which in turn increase the cost of production of these devices.

The principal object of the present invention therefore, is to provide an electrical capacitor which overcomes these and other defects in the known capacitors of the type described above.

Another important object of the invention is to provide a thin film multilayer capacitor which, during its construction, can easily be subjected to various operations without causing its breakdown.

Still another object of the invention is to provide a thin film multilayer electrical capacitor which is capable of high capacitance at low voltage operations.

A further object of the present invention is to provide a thin film multilayer capacitor which gives substantially high capacitance valves and yet occupies substantially the same area as heretofore occupied by less effective capacitors.

A still further object of this invention is to fabricate a multilayer film capacitor having auxiliary valve metal pads which during the construction of the capacitor are used to protect the anodic film on the first valve metal film from breaking down during second anodization step, and which are used to contact conductive films forming counter-electrodes.

A still further object of the present invention is to provide a multilayer film capacitor in which the second and all other subsequent anodizations have the same insluation thickness as the first anodic oxide layer on the base valve metal film.

The foregoing and other objects, features and advantages of the invention will be apparent from the following more particular description of a special embodiment of the invention, as illustrated in the accompanying drawings:

FIGURE 1 is a highly enlarged perspective fragmentary view of a capacitor of this invention constructed on a suitable substrate;

FIGURE 2 is a cross-sectional view on an exaggerated scale of the device of FIG. 1 taken at the line 2—2.

Briefly, in accordance with the present invention, a thin film and two auxiliary pads of a valve metal, such as tantalum are deposited by cathodic sputtering on a suitable substrate. The valve metal film is then anodized and a conductive film of a suitable metal, such as nickel, gold, etc., is vapor deposited on the anodized film and desired portions of the two pads. A substantially thick coating of a suitable dielectric material, such as SiO, SiO$_2$, etc., is vapor deposited on the surface of the second conductive film. Another valve metal film is sputtered on desired portions of the thick dielectric layer. This unit is then subjected to an anodizing operation which results in the growth of oxide layers on the second valve metal film and the exposed portions of the two auxiliary pads. It may be noted here that the voltage that in the conventional method, described above, appeared across the anodic layer on the first valve metal film, in the instant case appears on the surface of the auxiliary pads thereby forming oxide layers on the pads. Thus it is the oxide layers on these pads that effectively help in preventing the current leakage through the first anodic layer and hence prevent its eventual break-down. If desired, a thick dielectric film of a suitable material, such as silicon monoxide, may be vapor deposited on the surface of the second valve metal film.

Now, referring more particularly to the drawings, a film 11 and two relatively small layers or pads 12 and 13 of a suitable conductive metal, such as a valve metal selected from the group including tantalum, aluminum, zirconium, niobium, hafnium, titanium, etc., are cathodically sputtered in electrically isolated relationship through a suitable physical mask on a suitable substrate 14, such as a glass plate. As stated above, the film and pad can be of any of the valve metals mentioned above. However, in a preferred illustrated embodiment tantalum is used. Preferred substrate materials for this invention are glasses, glazed ceramics and all other types of refractory materials and high melting metals that meet the requirements of heat resistance and non-conductivity.

The film 11, which acts as the lower or base electrode, is anodized to grow a thin insulating oxide coating 15 on its surface. This is done by placing the glass substrate carrying the conductive valve film in an electrolyte along with an electrode of some neutral metal and applying a D.C. potential, the film 11 being made positive. An oxide layer 15 of thickness proportional to the applied voltage builds up on the film 11, virtually the entire applied voltage being dropped across the oxide. Thus the surface of the oxide layer 15 is at cathode or solution potential, while the interior of the film 11 is at anode potential. It may be noted here that at this stage of the operation no oxide is formed on the tantalum pads 12 and 13 as they are not electrically connected during the anodization step.

A second conductive film 16 of a suitable metal is vapor deposited through a suitable physical mask on the anodically coated tantalum film 11 and desired portions of the tantalum pads 12 and 13. Ideally it is desirable to use the same valve metal for film 16 as used to form film 11. In practice, however, this approach does not work for valve metal electrodes tend to short through oxide layers. Preferred metals for forming film 16 are therefore nickel, gold, tin, silver and the like metals that show the least tendency of breaking through the anodic oxide film 15. For the purposes of this illustration, however, I use nickel. The above unit thus forms a complete single capacitor with film 11 acting as the lower or base electrode, film 16 as the upper or counter-electrode and the anodic oxide film 15 as the dielectric separator of the capacitor. However, in order to increase capacitance per unit area it is necessary to build up this capacitor into multiple layers so that a plurality of such capacitors will be combined in parallel with one another in one composite unit.

Another suitable dielectric coating 17, such as a layer or silicon monoxide substantially thicker than the previously formed anodic oxide layer, is vapor deposited through a suitable physical mask on the nickel film 16 and desired portions of the pads 12 and 13, as shown. Then a second tantalum film 18 is sputtered as before on selected portions of the thick dielectric SiO layer. As before, the film 18 and exposed portions 12' and 13' of the pads 12 and 13 are subjected to an anodization operation to form oxide layers 19, 20 and 21 on their respective surfaces. It will be noticed here that the anodization voltage that in the prior art methods described above appeared on the surface of the counterelectrode 16 across the anodic oxide coating 15, in the instant improved invention appears on the exposed surface 12' and 13' of the auxiliary pads and results in the formation of anodic oxide layers 20 and 21 thereon. These oxide layers in turn ultimately substantially reduce to a minimum the leakage currents and thus prevent the breakdown of the anodic film 15. Also, it will be observed that by the use of auxiliary pads one is enabled to apply the same voltage drop during the second anodization step as used to form the first anodic insulating layer with the result that the second anodic layer 19 acquires the same thickness as the thickness of the first anodic coating 15. Using suitable physical masks two conductive films 23 and 24 of a suitable metal, such as nickel, are then laid down by cathodic sputtering as shown and in such a way that these films are in electrical contact with auxiliary pads and hence tantalum pads 12 and 13 and therethrough with counter-electrode 16. Films 23 and 24 also are in electrical contact with counter-electrode 22. This contact is established by subsequently vaporizing nickel, or the like, through a suitable physical mask, onto the anodically coated film 18, the dielectric layer 17, and films 23 and 24 as shown in FIGS. 1 and 2. If desired a second silicon monoxide layer 25 may be evaporated by means of a suitable physical mask on films 22, 23 and 24. It will be realized that since sputtering induces penetration of the anodic oxide layers, this process should be avoided in the formation of counter-electrodes 16 and 22 and the dielectric layers 17 and 25 but used in the deposition of conductive films 23 and 24 so that these films may be formed and placed in electrical contact with the tantalum pads, breaking down the oxide layers on their surfaces, in one single operation.

It will be seen that while the above illustration has been described with reference to a special embodiment thereof, modifications that will readily suggest themselves to persons skilled in the art may be made without departing from the essentials of the invention. For instance, whereas in the illustrated embodiment two auxiliary pads have been used, it is possible to use only one auxiliary pad and consequently only one film to make electrical contacts between the counter-electrodes. Also, a dielectric material other than silicon monoxide may be used to insulate the second layer of valve metal and its counter-electrode from the first similar unit, or the thick dielectric layer and the conductive films acting as the counter-electrodes may be deposited by a method other than the vapor deposition method of the illustrated embodiment.

While the invention has been particularly shown and described with reference to a preferred embodiment thereof, it will be understood by those skilled in the art that various changes in form and details may be made therein without departing from the spirit and scope of the invention.

What is claimed is:

1. A multiple layer multi-unit electrical capacitor comprising: a plurality of conductive and dielectric films arranged alternately on a suitable substrate such that at least one of said conductive films is in engagement with the substrate and such that each pair of conductive films separated by a dielectric film forms one complete unit; each unit being spaced from similar successive units by means of a dielectric film; one said conductive film of each unit forming a base electrode, while the second conductive film of the said unit acts as a counter-electrode; said counter-electrodes of successive units being electrically connected together through at least one conductive pad positioned on said substrate and spaced apart from the base electrodes.

2. A capacitor as in claim 1, wherein said conductive pad and at least one said conductive film of each of said units is of a valve metal selected from the group consisting of tantalum, aluminum, zirconium, niobium, hafnium and titanium, said second conductive film of said successive units and the conductor means interconnecting them with said pad being a film of a metal selected from the group consisting of nickel, gold, silver, tin, lead, and copper, and said dielectric separator between said conductive films of each said unit is an anodic oxide film on said valve metal film.

3. An electrical capacitor according to claim 2 in which said anodic dielectric separators between said conductive films of each of said units are of the same insulation thickness.

4. An electrical capacitor of claim 1, wherein said conductive pad and said conductive film forming a base electrode in each of said units are films of tantalum; said second conductive film forming corresponding counter-electrodes in each of said units and the electrically conductive means contacting said counter-electrodes are films of a metal selected from the group consisting of nickel, gold, silver, tin, lead, and copper; said dielectric separators between the two electrodes of each said unit is an anodic oxide film on said tantalum film, and a relatively thick layer of silicon monoxide separates said successive units from each other.

5. A method of making a multilayer multi-unit electrical capacitor which comprises laying down on a suitable substrate a conductive film as a base electrode and at least one other conductive film as a pad spaced from said base electrode, providing a first dielectric film on said base electrode, laying down a conductive film as a counter electrode over said first dielectric film and only a part of said pad, providing a second dielectric film on said counter electrode and another part of said pad, laying down a second base electrode over said second dielectric film spaced apart from said pad, providing a third dielectric film on said second base electrode, laying down a connecting conductive film in electrical contact with a remaining part of said pad and extending over a part of said third dielectric film and spaced apart from said second base electrode, and laying down a conductive film as a second counter electrode over said third dielectric film in electrical contact with said connective film.

6. The process of claim 5, wherein the dielectric films on the base electrodes are anodically grown and a dielectric film is provided on the second counter electrode.

7. A method of making an improved multilayer, multi-unit electrical film capacitor of the type described, which comprises laying down on a substrate in one operation the first base film electrode and spaced apart therefrom at least one auxiliary film pad of the same valve metal, forming a dielectric anodic oxide film on said base electrode, laying down a first counter-electrode in the form of a film in contact with said oxide film and a portion of said pad thereby forming the first unit of the capacitor, laying down a relatively thick dielectric film electrically isolating said first unit and an additional portion of said pad, laying down a second base film electrode of a valve metal on a portion only of said thick dielectric film, simultaneously forming a dielectric anodic oxide film on said second base electrode and the remaining portion of said pad, cathodically sputtering a conductive film in contact with the anodic film on said pad and a part of said thick dielectric film but out of contact with said second base electrode and its anodic oxide film, and laying down a film counter electrode in contact wtih said conductive film and the oxide film of said second base electrode.

References Cited by the Examiner

UNITED STATES PATENTS 2,930,951    3/1960    Burger _____ 317—258 X

FOREIGN PATENTS 162,056    3/1954    Australia.
600,409    4/1948    Great Britain.

OTHER REFERENCES

Berry et al.: Tantalum—Printed Capacitors, Proceedings of The IRE June 1959, pp. 1070–1075.

ROBERT K. SCHAEFER, *Primary Examiner.*

JOHN F. BURNS, *Examiner.*

E. GOLDBERG, *Assistant Examiner.*